United States Patent
Guo et al.

(10) Patent No.: US 12,407,367 B2
(45) Date of Patent: Sep. 2, 2025

(54) SYSTEMS AND METHODS FOR REDUCING LOADING IN ANTENNA SWITCH MODULE MULTIPLEXING

(71) Applicant: Skyworks Solutions, Inc., Irvine, CA (US)

(72) Inventors: Jiunn-Sheng Guo, Eastvale, CA (US); Hailing Yue, Newbury Park, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 379 days.

(21) Appl. No.: 18/191,508

(22) Filed: Mar. 28, 2023

(65) Prior Publication Data

US 2023/0318634 A1 Oct. 5, 2023

Related U.S. Application Data

(60) Provisional application No. 63/362,299, filed on Mar. 31, 2022.

(51) Int. Cl.
*H04B 1/00* (2006.01)
*H04B 1/40* (2015.01)

(52) U.S. Cl.
CPC ........... *H04B 1/0057* (2013.01); *H04B 1/006* (2013.01)

(58) Field of Classification Search
CPC .... H04B 1/005; H04B 1/0053; H04B 1/0057; H04B 1/006; H04B 1/0064; H04B 1/38; H04B 1/40
See application file for complete search history.

(56) References Cited

U.S. PATENT DOCUMENTS

| | | | |
|---|---|---|---|
| 7,643,848 B2 * | 1/2010 | Robinett | H04B 1/006 455/550.1 |
| 9,608,749 B2 * | 3/2017 | Mueller | H04B 1/0057 |
| 11,323,193 B2 * | 5/2022 | Tahara | H04B 1/0057 |
| 11,956,069 B2 * | 4/2024 | Mori | H03H 7/1758 |
| 2018/0138574 A1 | 5/2018 | Li et al. | |
| 2022/0255567 A1 | 8/2022 | Guo et al. | |
| 2022/0345103 A1 | 10/2022 | Guo et al. | |
| 2023/0097428 A1 | 3/2023 | Guo | |
| 2023/0163745 A1 | 5/2023 | Guo et al. | |

* cited by examiner

*Primary Examiner* — Quochien B Vuong
(74) *Attorney, Agent, or Firm* — Knobbe, Martens, Olson & Bear, LLP

(57) ABSTRACT

Systems and methods for reducing loading in antenna switch module multiplexing are disclosed. In one aspect, a radio frequency front end includes a plurality of filters configured to filter radio frequency signals, the filters including a first filter configured for single band wireless communication and two second filters configured for multiplexing wireless communication. The radio frequency front end further includes an antenna switch module including a first switch configured to connect an antenna to the first filter for the single band wireless communication, and two second switches configured to connect the antenna to the second filters for the multiplexing wireless communication, the second switches having a lower on-state resistance than the first switch.

20 Claims, 9 Drawing Sheets

SYSTEMS AND METHODS FOR REDUCING LOADING IN ANTENNA SWITCH MODULE MULTIPLEXING

CROSS-REFERENCE TO RELATED APPLICATION(S)

This application claims the benefit of U.S. Provisional Application No. 63/362,299, filed Mar. 31, 2022. The foregoing application is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field

Embodiments of this disclosure relate to diplexers that can be used in radio frequency (RF) front end modules (FEMs).

Description of the Related Technology

With 5 G development, carrier aggregation (CA) is being implemented in radio frequency (RF) modules. To support multiplexing functions such as carrier aggregation and ENDC ((E-UTRAN), New Radio, Dual Connectivity), a plurality of filters may be connected to the antenna at the same time. This simultaneous connection of multiple filters may lead to loading between the filters, which can reduce performance and or power efficiency.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a radio frequency front end comprising: a plurality of filters configured to filter radio frequency signals, the filters including a first filter configured for single band wireless communication and two second filters configured for multiplexing wireless communication; and an antenna switch module including a first switch configured to connect an antenna to the first filter for the single band wireless communication, and two second switches configured to connect the antenna to the second filters for the multiplexing wireless communication, the second switches having a lower on-state resistance than the first switch.

In some embodiments, each of the second switches has a longer gate length than the first switch.

In some embodiments, each of the second switches have a fewer number of stacked gates than the first switch.

In some embodiments, the first switch is configured to handle a higher power level than each of the second switches.

In some embodiments, the antenna switch module has a die size that is the same or smaller than an antenna switch module having a same number of switches that all have the same configuration as the first switch.

In some embodiments, the multiplexing wireless communication includes carrier aggregation or evolved universal mobile telecommunications system, new radio, dual connectivity.

In some embodiments, the first switch has a plurality of gates each having a length of about 140 um and each of the second switches has a plurality of gates each having a length of about 180 um.

In some embodiments, the plurality of filters further include a third filter configured for single band wireless communication, the first and third filters each including duplexed receive and transmit filters, the two second filters including a transmit second filter and a receive second filter, and the plurality of filters further including two fourth filters including a transmit fourth filter and a duplexed fourth filter including duplexed receive and transmit filters.

Another aspect is a mobile device comprising: an antenna configured to transmit and received radio frequency signals; a plurality of filters configured to filter radio frequency signals, the filters including a first filter configured for single band wireless communication and two second filters configured for multiplexing wireless communication; and an antenna switch module including a first switch configured to connect the antenna to the first filter for the single band wireless communication, and two second switches configured to connect the antenna to the second filters for the multiplexing wireless communication, the second switches having a lower on-state resistance than the first switch.

In some embodiments, each of the second switches has a longer gate length than the first switch.

In some embodiments, each of the second switches have a fewer number of stacked gates than the first switch.

In some embodiments, the first switch is configured to handle a higher power level than each of the second switches.

In some embodiments, the antenna switch module has a die size that is the same or smaller than an antenna switch module having a same number of switches that all have the same configuration as the first switch.

In some embodiments, the multiplexing wireless communication includes carrier aggregation or evolved universal mobile telecommunications system, new radio, dual connectivity.

In some embodiments, the first switch has a plurality of gates each having a length of about 140 um and each of the second switches has a plurality of gates each having a length of about 180 um.

Yet another aspect is a radio frequency module comprising: a front end including a plurality of filters configured to filter radio frequency signals, the filters including a first filter configured for single band wireless communication and two second filters configured for multiplexing wireless communication, and an antenna switch module including a first switch configured to connect an antenna terminal to the first filter for the single band wireless communication, and two second switches configured to connect the antenna terminal to the second filters for the multiplexing wireless communication, the second switches having a lower on-state resistance than the first switch; and an antenna coupled to the antenna terminal.

In some embodiments, each of the second switches has a longer gate length than the first switch.

In some embodiments, each of the second switches have a fewer number of stacked gates than the first switch.

In some embodiments, the first switch is configured to handle a higher power level than each of the second switches.

In some embodiments, the antenna switch module has a die size that is the same or smaller than an antenna switch module having a same number of switches that all have the same configuration as the first switch.

DETAILED DESCRIPTION

Figure 1:
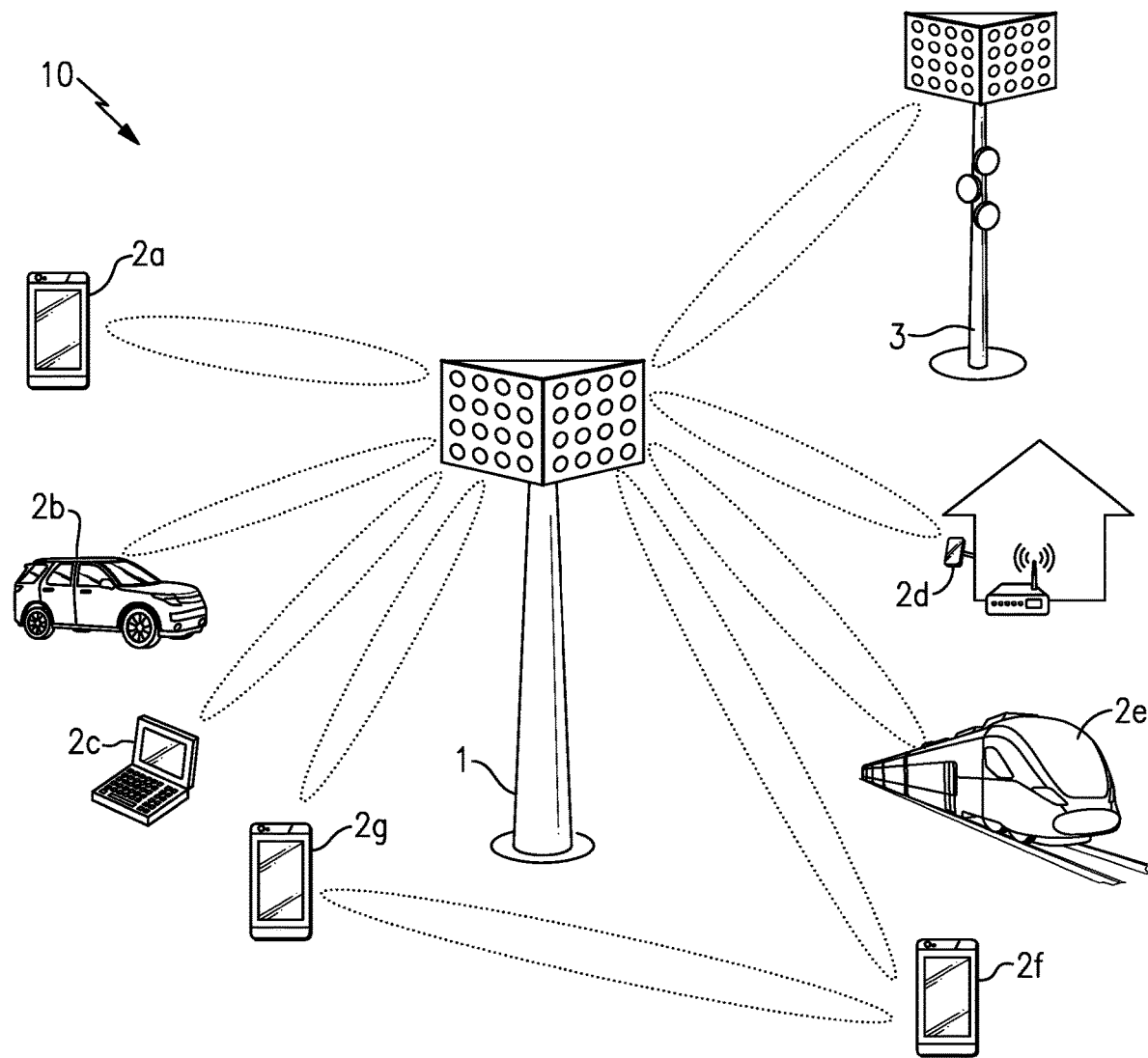
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Proliferation of frequency bands and carrier aggregation combinations in RF front ends (RFFEs) has been driving higher costs to support features. It is desirable to reduce internal multichip module (MCM)/surface mount (SMT) content as well the number of includes active devices, in order to contain costs to meet desired or specified costs.

In certain implementations, filters involved in carrier aggregation band combinations are commonly diplexed/multiplexed. This also typically involves resolving the receive path for each band separately into distinct low noise amplifiers (LNAs). This has traditionally been necessary as the two or more bands in carrier aggregation need to operate independently, with separate and full range of gain control for each band, due to the cellular radio environment in which the bands are deployed.

According to aspects of this disclosure two or more band filters are diplexed/multiplexed, but are recombined to implement a dual-passband filter (1-in/1-out). The resulting receive path includes a single gain-stage, with common matching elements. The output current is generated via separate current-buffers/cascades with separate resonant loads and design that allows independent current/gain control in each band path. Single-band operation is largely unchanged compared to other implementations, except for some parasitic loading due to the inclusion of additional active devices.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5 G technology in Release 16. Subsequent 3GPP releases will further evolve and expand 5G technology. 5G technology is also referred to herein as 5G New Radio (NR).

Example Communication Networks and Wireless Communication Devices

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1) in the range of about 410 MHz to about 7.125 GHz, Frequency Range 2 (FR2) in the range of about 24.250 GHz to about 52.600 GHz, or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
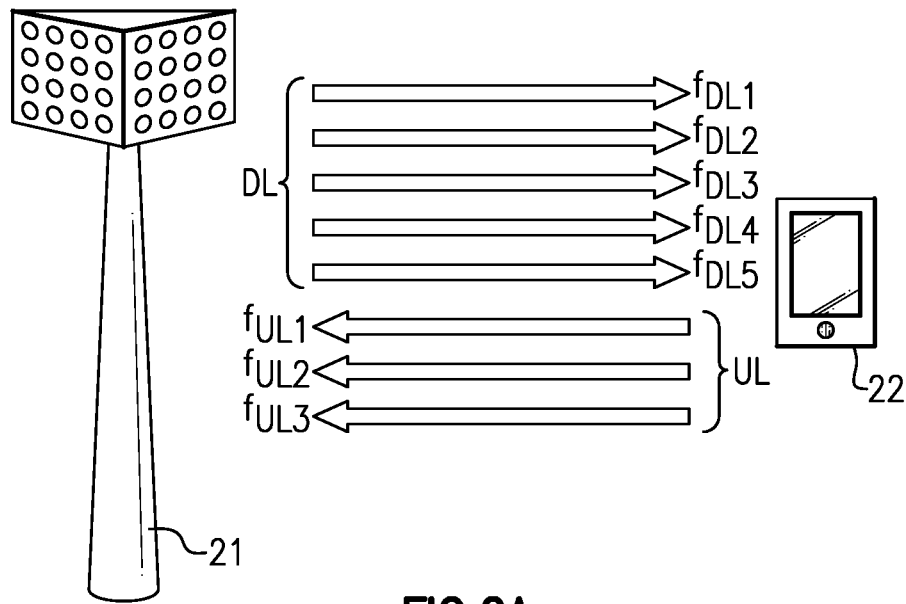
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
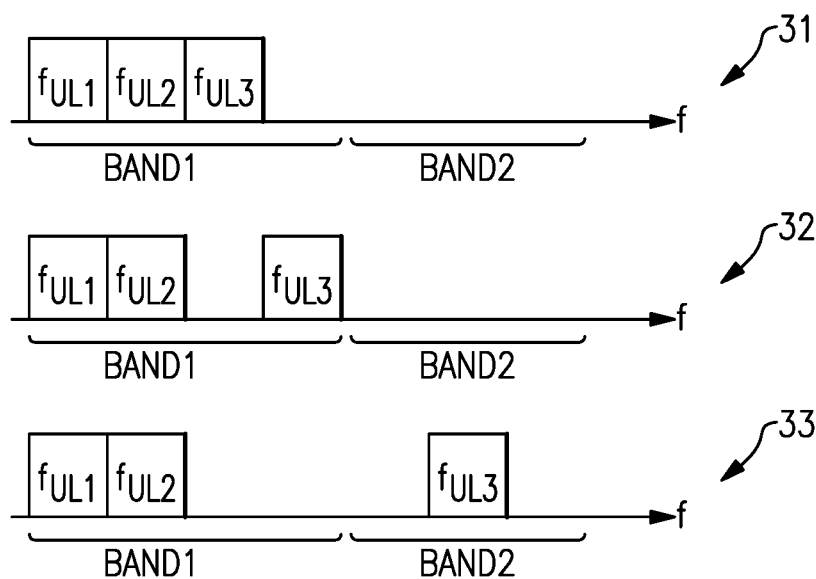
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
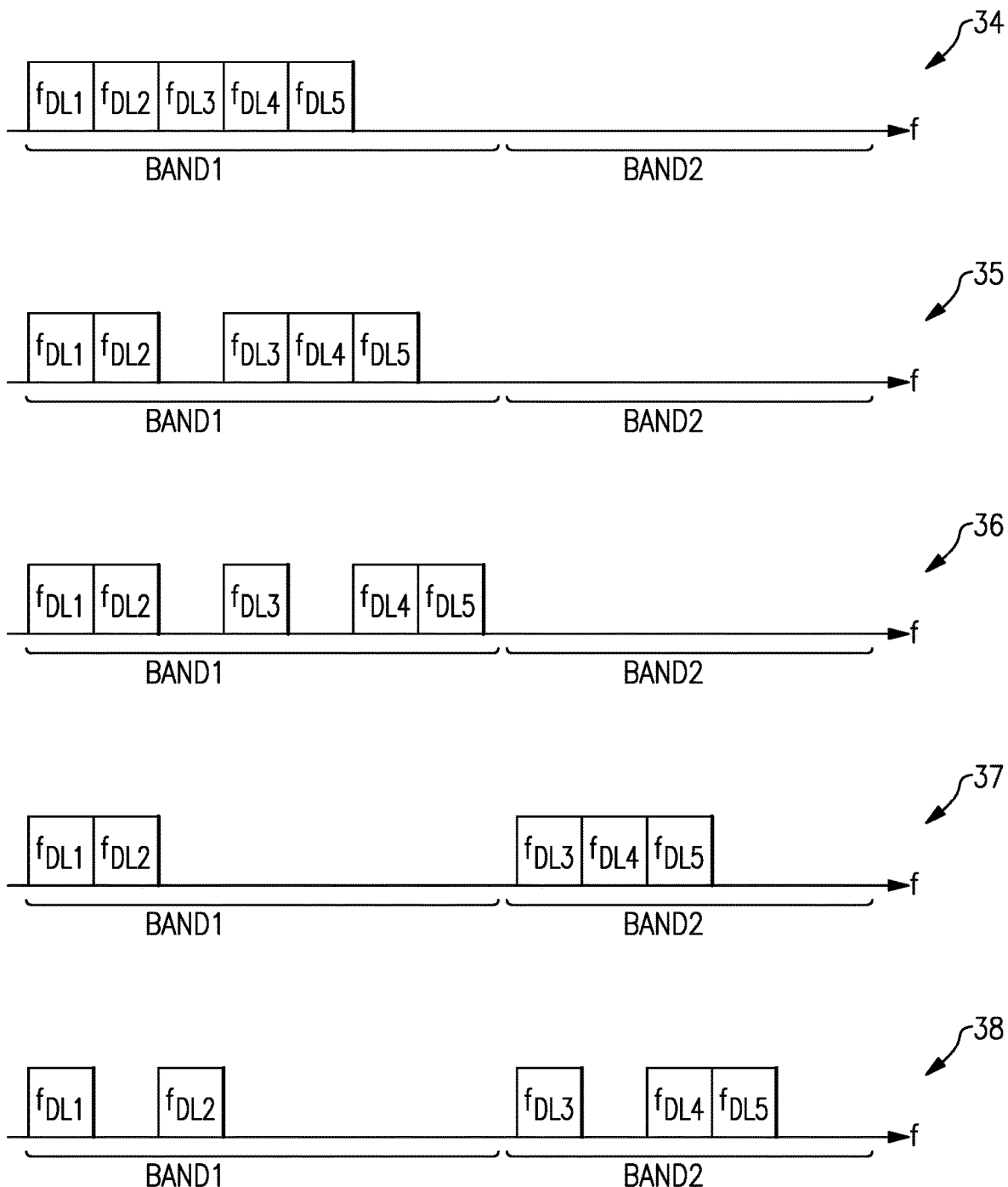
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3:
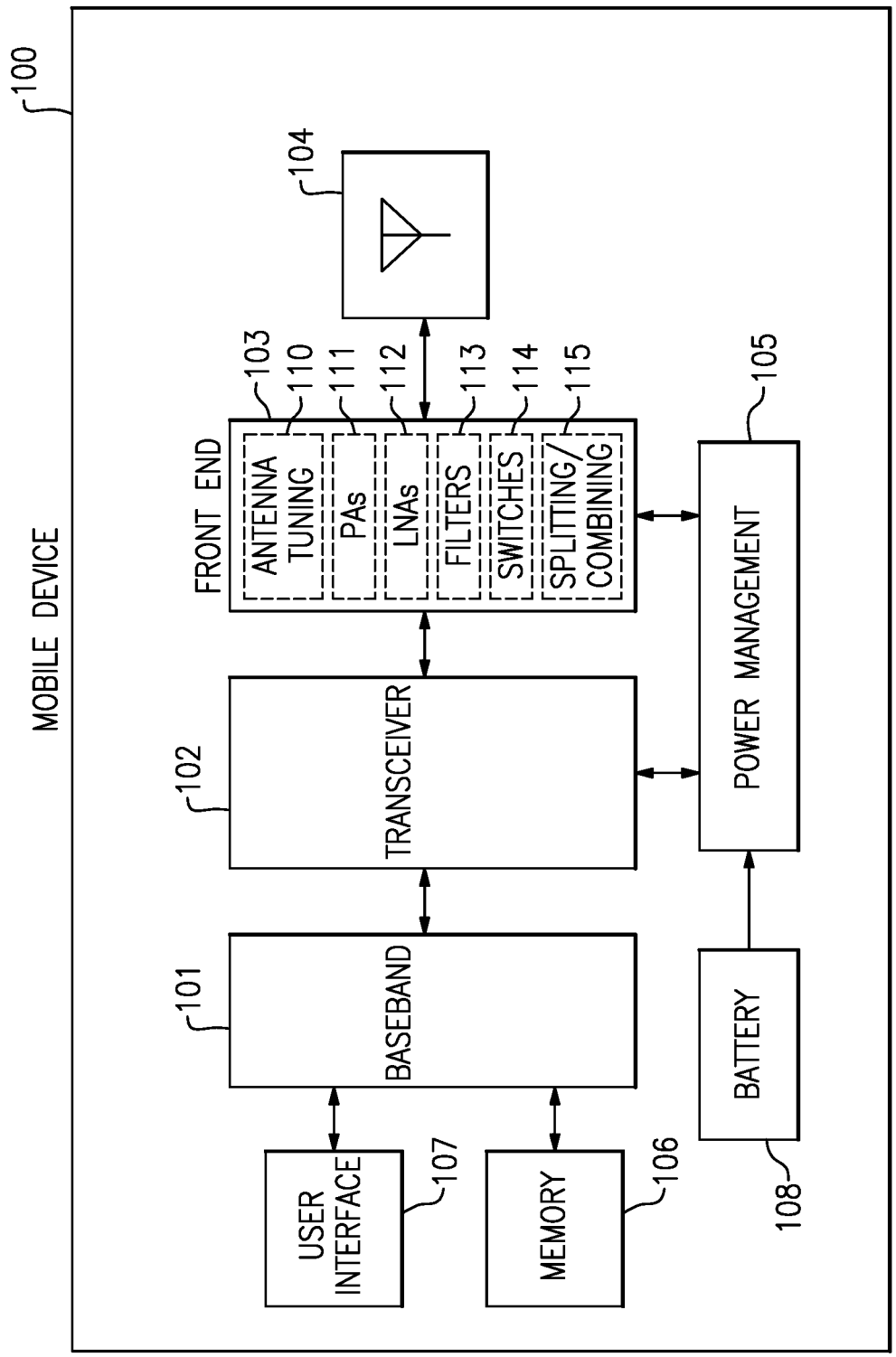
FIG. 3 is a schematic diagram of one embodiment of a mobile device.

FIG. 3 is a schematic diagram of one embodiment of a mobile device 100. The mobile device 100 includes a baseband system 101, a transceiver 102, a front end system 103, antennas 104, a power management system 105, a memory 106, a user interface 107, and a battery 108.

The mobile device 100 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 102 generates RF signals for transmission and processes incoming RF signals received from the antennas 104. It will be understood that various functionalities associated with the transmission and receiving of RF signals can be achieved by one or more components that are collectively represented in FIG. 3 as the transceiver 102. In one example, separate components (for instance, separate circuits or dies) can be provided for handling certain types of RF signals.

The front end system 103 aids in conditioning signals transmitted to and/or received from the antennas 104. In the illustrated embodiment, the front end system 103 includes antenna tuning circuitry 110, power amplifiers (PAs) 111, low noise amplifiers (LNAs) 112, filters 113, switches 114, and signal splitting/combining circuitry 115. However, other implementations are possible. For example, in some embodiments, the switches 114 are implemented in an antenna switch module (ASM) configured to electrically connect one or more of the antennas 104 to one or more of the filters 113.

For example, the front end system 103 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 100 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 104 can include antennas used for a wide variety of types of communications. For example, the antennas 104 can include antennas for transmitting and/or receiving signals associated with a wide variety of frequencies and communications standards.

In certain implementations, the antennas 104 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 100 can operate with beamforming in certain implementations. For example, the front end system 103 can include amplifiers having controllable gain and phase shifters having controllable phase to provide beam formation and directivity for transmission and/or reception of signals using the antennas 104. For example, in the context of signal transmission, the amplitude and phases of the transmit signals provided to the antennas 104 are controlled such that radiated signals from the antennas 104 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 104 from a particular direction. In certain implementations, the antennas 104 include one or more arrays of antenna elements to enhance beamforming.

The baseband system 101 is coupled to the user interface 107 to facilitate processing of various user input and output (110), such as voice and data. The baseband system 101 provides the transceiver 102 with digital representations of transmit signals, which the transceiver 102 processes to generate RF signals for transmission. The baseband system 101 also processes digital representations of received signals provided by the transceiver 102. As shown in FIG. 3, the baseband system 101 is coupled to the memory 106 of facilitate operation of the mobile device 100.

The memory 106 can be used for a wide variety of purposes, such as storing data and/or instructions to facilitate the operation of the mobile device 100 and/or to provide storage of user information.

The power management system 105 provides a number of power management functions of the mobile device 100. In certain implementations, the power management system 105 includes a PA supply control circuit that controls the supply voltages of the power amplifiers 111. For example, the power management system 105 can be configured to change the supply voltage(s) provided to one or more of the power amplifiers 111 to improve efficiency, such as power added efficiency (PAE).

As shown in FIG. 3, the power management system 105 receives a battery voltage from the battery 108. The battery 108 can be any suitable battery for use in the mobile device 100, including, for example, a lithium-ion battery.

Reducing Loading for Antenna Switch Module Multiplexing

Depending on the standard used for radio frequency communication, two or more bands used to implement the standard may have at least partially overlapping frequencies.

5G NR introduced several ENDC (Evolved Universal Mobile Telecommunications System (E-UTRAN), New Radio, Dual Connectivity) cases that enable communication over two different frequency signals at the same time.

According to 3GPP standards documents, ENDC allows user equipment to connect to an LTE enodeB that acts as a master node and a 5G gnodeB that acts as a secondary node. In effect, ENDC allows 4G LTE and 5G bandwidth to be used at the same time, and when users attempt to download content, such as a video, the speed at which that video transfers comes from both 4G LTE and 5G simultaneously. In order to implement ENDC, the user equipment front end can connect a single antenna to two receive paths, corresponding to the frequency bands use for the LTE enodeB and 5G gnodeB wireless nodes.

Figure 4:
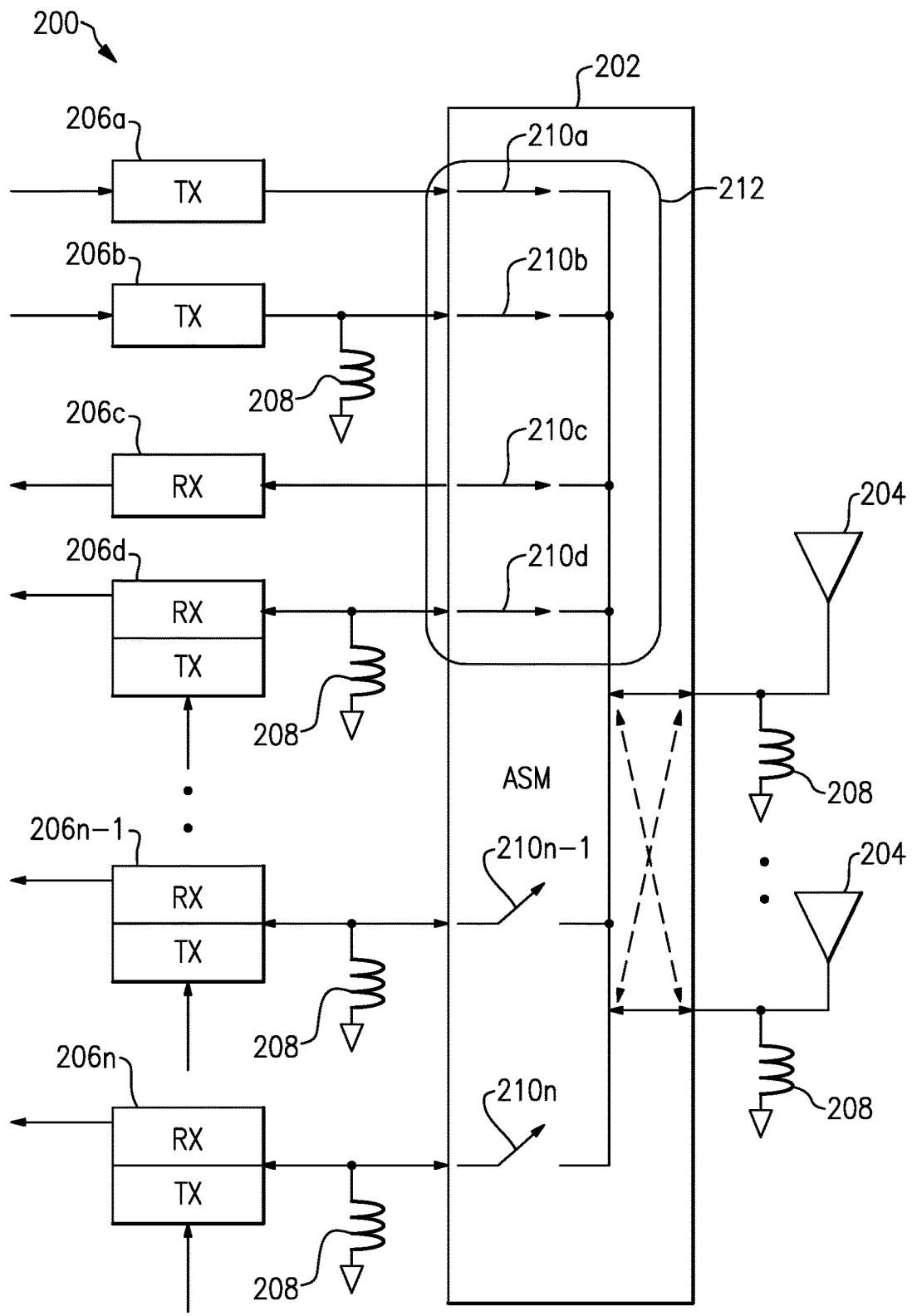
FIG. 4 illustrates a portion of a front end module configured to implement ENDC in accordance with aspects of this disclosure.

To implement ENDC, a front end module can include an antenna switch module (ASM) configured to connect the antenna to two different frequency bands. FIG. 4 illustrates a portion of a front end module 200 configured to implement ENDC in accordance with aspects of this disclosure. In some embodiments, the front end module 200 can include a first filter configured for single band wireless communication and two second filters configured for multiplexing wireless communication. The front end module can also include an antenna switch module including a first switch configured to connect an antenna to the first filter for the single band wireless communication, and two second switches configured to connect the antenna to the second filters for the multiplexing wireless communication. As discussed herein, the second switches can have a lower on-state resistance than the first switch.

With reference to FIG. 4, the front end module 200 includes an antenna switch module 202, one or more antennas 204, and a plurality of filters 206a, 206b, 206c, 206d, . . . , 206n-1, and 206n. Example filter types which can be used in implementing the filters 206a-206n include acoustic filters, such as surface acoustic wave (SAW), bulk acoustic wave (BAW) filters, or film bulk acoustic resonator (FBAR) filters, and/or discrete filters including separate inductor(s) and/or capacitor(s). The front end module 200 may further include a plurality of inductors 208 connecting the antenna(s) 204 and/or one or more of the filters 206a-206n to ground. Depending on the implementation, the inductors 208 may have different values. The inductors 208 can be manufactured using different technologies, such as SMT and/or embedded in the PCB. The ASM 202 includes a plurality of switches 210a, 210b, 210c, 210d, . . . , 210n-1, and 201n configured to selectively connect the antenna(s) 204 to a corresponding one of the filters 206a-206n. Depending on the communication technique being used, the ASM 202 can select one or more of the antenna(s) 204 to be connected to the one of the filters 206a-206n being used to filter the RF signals. In some situations, when two or more of the filters 206a-206n being used simultaneously, the ASM 202 can connect each of the two or more of the filters 206a-206n to a corresponding one or more of the antenna(s) 204.

When using ENDC, the ASM 202 is configured to connect the antenna(s) 204 to two bands simultaneously. FIG. 4 illustrates an example ENDC case 212 in which the transmit filters 206a and 206b and receive filters 206c and 206d for two different bands are connected to the antenna(s) 204 (e.g., via switches 210a-210d), while the other switches 210n-1 and 210n are configured to disconnect their respective filters 206n-1 and 206n from the antenna(s) 204. The ASM 202 may also be configured to connect two or more bands to the antenna(s) 204 when communicating using carrier aggregation. In one example embodiment, the first filter 206a includes a transmit filter for a first band, the second filter 206b includes a transmit filter for a second band, the third filter 206c includes a receive filter for first band, and the fourth filter 206d includes a receive filter for the second band and a third band as well as a transmit filter for the third band. In this example embodiment, the fifth filter 206n-1 includes receive and transmit filters for a fourth band and the sixth filter 206n includes receive and transmit filters for a fifth band. When two filters are included together, they may be duplexed, allowing both a transmit chain and receive chain to be connected to the same switch 210a-210n within the ASM 202.

Each of the switches 210a-210n has a certain amount of on-state resistance Ron (also referred to as "Ron resistance") when the switch 210a-210n is turned on. When the ASM 202 connects two or more of the filters 206a-206n together to perform carrier aggregation or ENDC, the Ron resistance in each of the connected switches 210a-210n will impact the loading effect of each of the connected filters 206a-206n. For example, the Ron resistance of each of the connected switches 210a-210n may increase the loading to other connected filters 206a-206n in-band performance, which can increase insertion loss of the filters 206a-206n. In some cases, the insertion loss degradation could be around 0.4-0.5 dB or higher which has significant impact on the battery life of the mobile device as well as the power output Pout of the mobile device. Aspects of this disclosure relate to techniques for improving the battery life and/or power output Pout of a mobile device, for example, by reducing the insertion loss when performing carrier aggregation or ENDC. As described herein, embodiments of this disclosure can address the above-indicated problems by reducing the Ron resistance for at least some of the switches 210a-210n, thereby improving the front end module's 200 multiplexing performance.

One technique for reducing insertion loss is to reduce the number of stacks in the switch 210a-210n and reduce the entire ASM 202 die size. However, reducing the number of stacks in the switch 210a-210n can result in an increase in the Ron resistance of the switches 210a-210, which can have a negative impact on the loading effects when multiplexing multiple bands (e.g., during carrier aggregation and ENDC). Thus, while reducing the number of stacks in the switch 210a-210n may address insertion loss for single band implementations, this solution may not address or make exacerbate the loading issues encountered during carrier aggregation and/or ENDC.

Accordingly, aspects of this disclosure relate to techniques for reducing the Ron resistance for at least the switches 210a-210n of the ASM 202 which are used for carrier aggregation and/or ENDC. For example, in some implementations the Ron resistance of a switch 210a-210n can be reduced by increasing the stack size of the switch 210a-210n. As used herein, stack size generally refers to the length of each individual gate in a stack of transistors forming an individual switch 210a-210b. In some embodiments, the increase in the stack size of a switch 210a-210n may also be paired with reducing the number of stacks in the switch 210a-210n to further reduce the Ron resistance.

Figure 5:
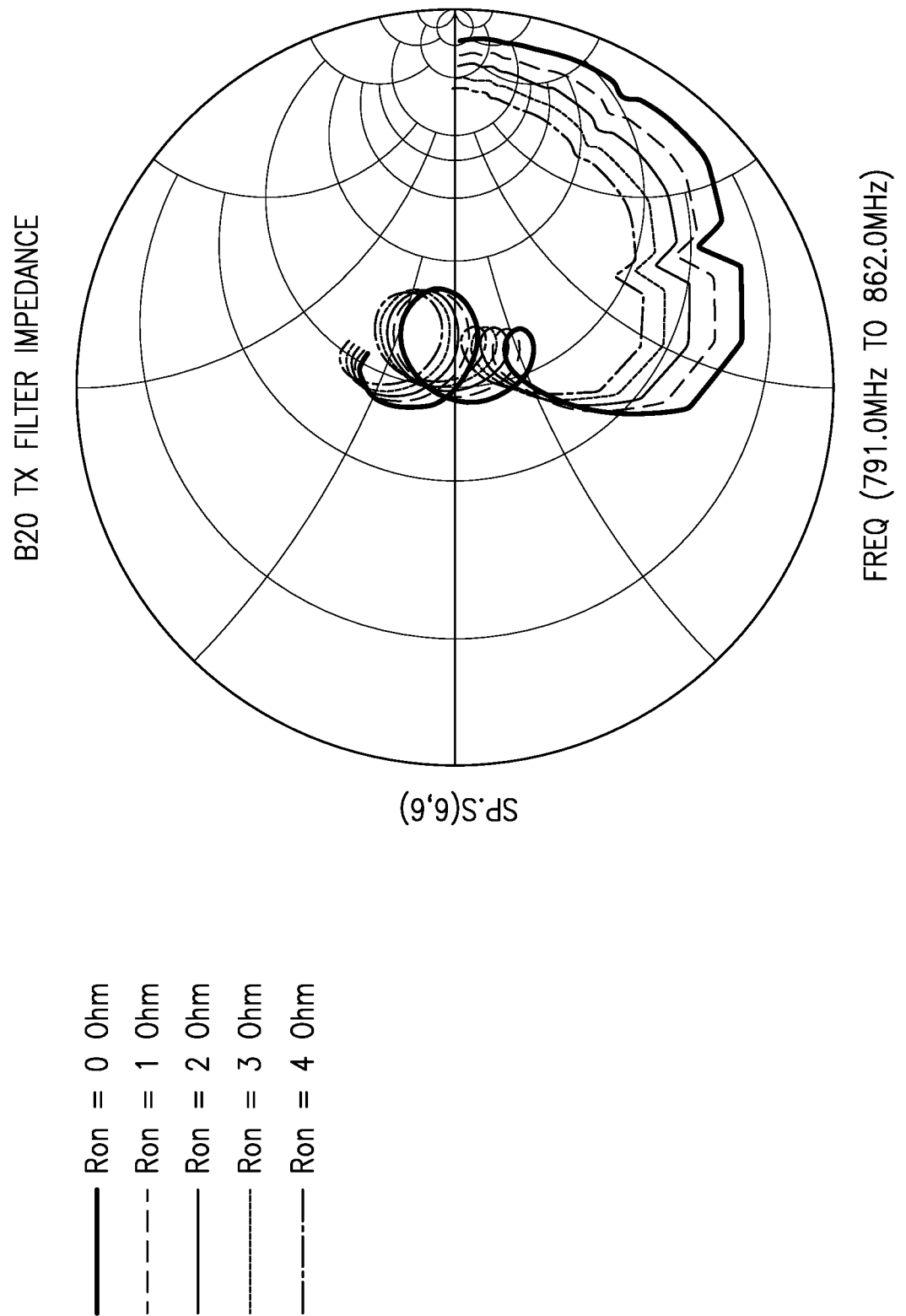
FIG. 5 is a Smith chart illustrating impact of Ron resistance on the impedance of an example filter in accordance with aspects of this disclosure.

FIG. 5 is a Smith chart illustrating impact of Ron resistance on the impedance of an example filter in accordance with aspects of this disclosure. The Smith chart shows the impedance for the B20 Tx filter over a range of frequencies from 791 MHz to 862 MHz when connected to a switch 210a-210n having different Ron resistance values, for example, Ron resistance values of 0 Ohm, 1 Ohm, 2 Ohm, 3 Ohm, and 4 Ohm. As shown in FIG. 5, as the Ron resistance of the switch 210a-210n decreases, the filter impedance at other connected filters frequency approaches an impedance of infinity (e.g., an open circuit) on the right side of the chart. At an impedance of infinity, the filter would produce no loading on other filters connected to the filter. In addition, as the impedance of the filter approaches infinity, the loading to other connected filters reduces loading introduced by the filter. Thus, overall loading between connected filters (e.g., for carrier aggregation and/or ENDC) can be reduced by moving the impedance of each filter closer to infinity. As illustrated in the Smith chart of FIG. 5, reducing the Ron resistance moves the impedance of the filter at other connected filters frequency closer to infinity, thereby reducing loading to other connected filters. Conversely, if Ron is increased, the impedance of the connected filter moves away from infinity, thereby increasing the loading to other connected filters. In additional higher Ron resistance values may also result in lower out of band (OOB) impedance and Gamma.

Figure 6:
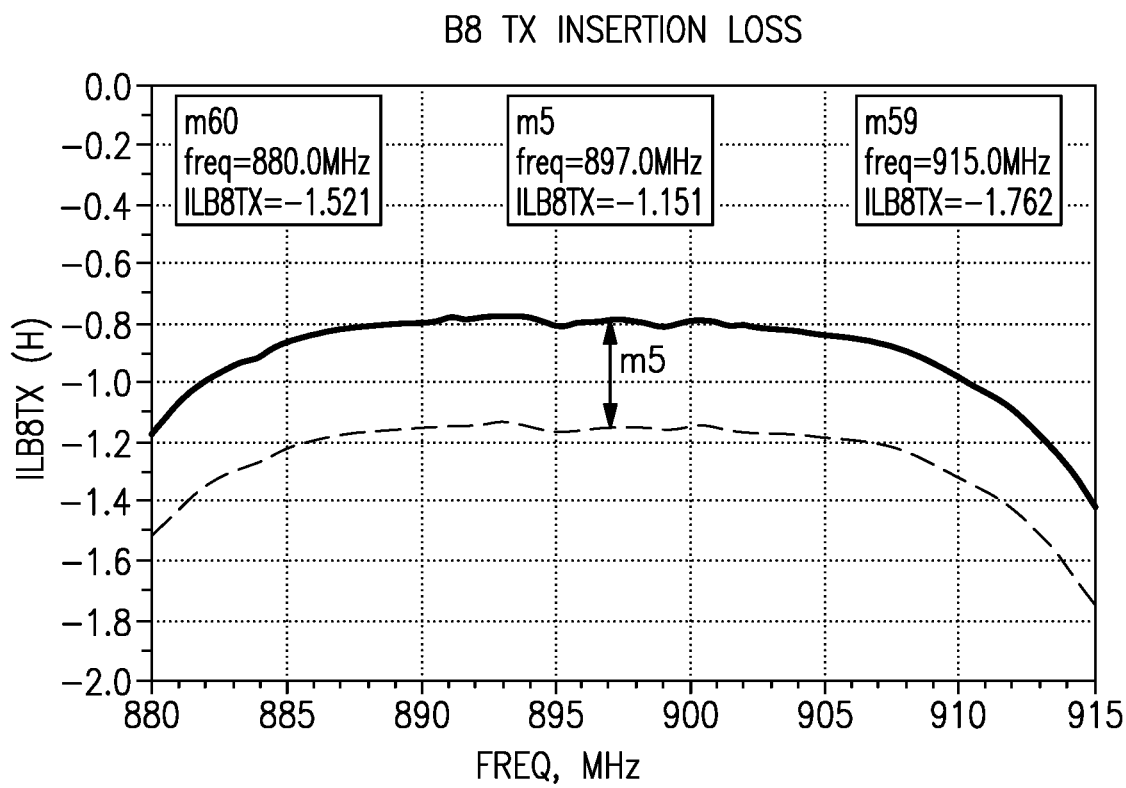
FIG. 6 is a graph illustrating the impact of Ron resistance to the insertion loss of an example filter in accordance with aspects of this disclosure.
Figure 7:
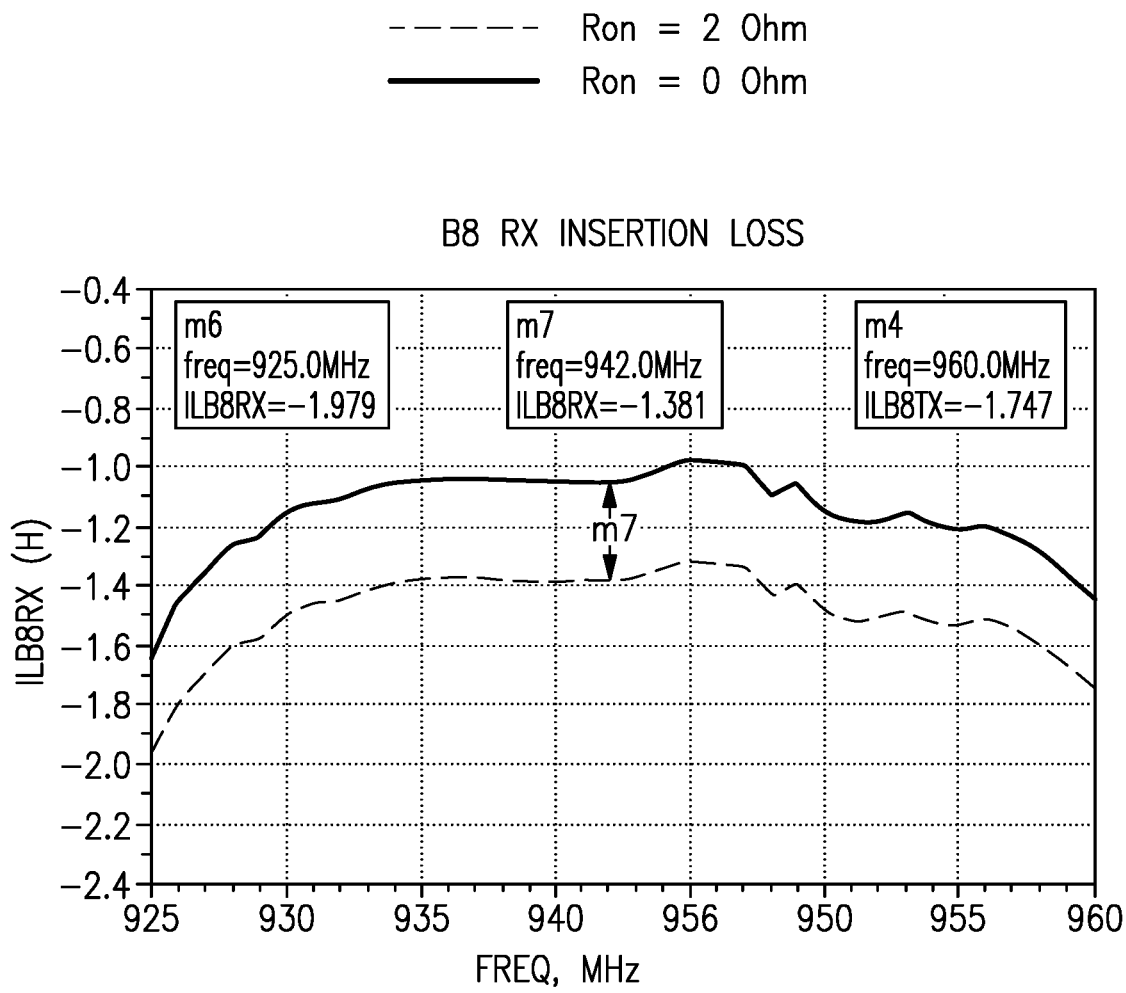
FIG. 7 is a graph illustrating the impact of Ron resistance to the insertion loss of another example filter in accordance with aspects of this disclosure.

FIG. 6 is a graph illustrating the impact of Ron resistance to the insertion loss of an example filter in accordance with aspects of this disclosure. FIG. 7 is a graph illustrating the impact of Ron resistance to the insertion loss of another example filter in accordance with aspects of this disclosure. In particular, FIG. 6 illustrates the insertion loss for the B8 Tx filter over a range of frequencies from 880 MHz to 915 MHz and FIG. 7 illustrates the insertion loss for the B8 Rx filter over a range of frequencies from 925 MHz to 960 MHz.

With reference to FIGS. 6 and 7, the insertion losses for switches 210a-210n having an Ron resistance of 0 Ohm and 2 Ohm are shown. In FIG. 6 there is a gap of about 0.36 dB between the insertion loss of the 0 Ohm and 2 Ohm switches 210a-210n while in FIG. 7 there is a gap of about 0.34 dB between the insertion loss of the 0 Ohm and 2 Ohm switches 210a-210n.

Figure 8:
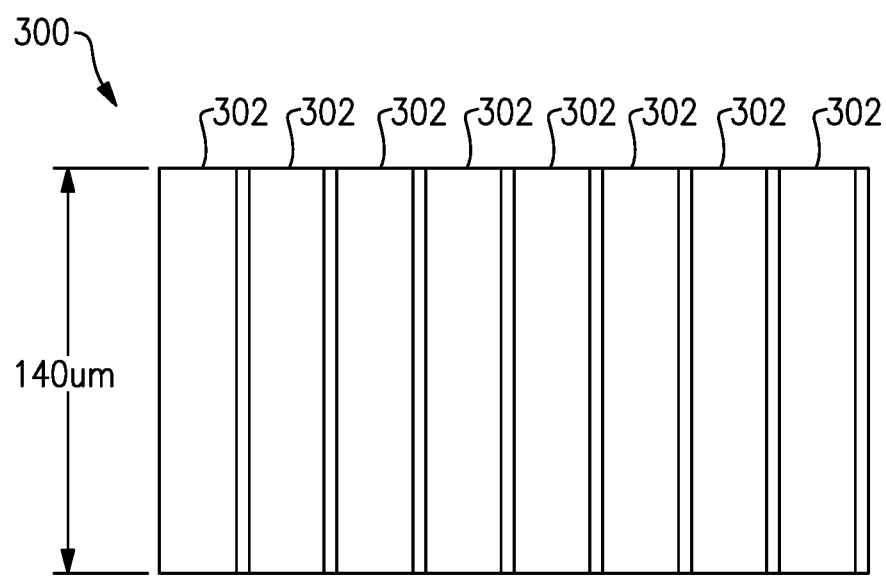
FIG. 8 illustrates a first switch stack for a switch in accordance with aspects of this disclosure.
Figure 9:
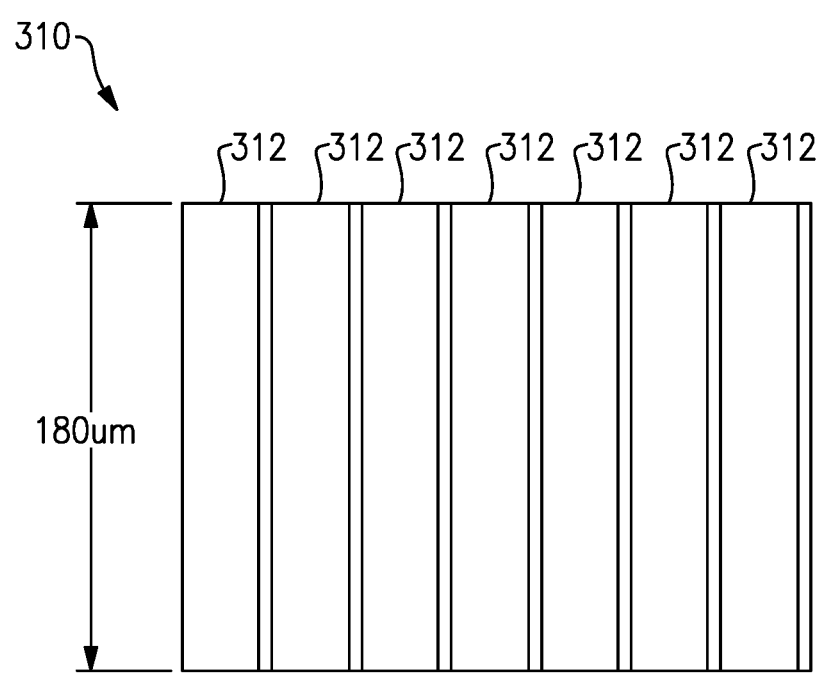
FIG. 9 a second switch stack for a switch having a lower Ron resistance in accordance with aspects of this disclosure.

FIG. 8 illustrates a first switch stack 300 for a switch 210a-210n in accordance with aspects of this disclosure. FIG. 9 a second switch stack 310 for a switch 210a-210n having a lower Ron resistance in accordance with aspects of this disclosure.

The first switch stack 300 of FIG. 8 may be used to connect filters 206n-1 and 206n which are not multiplexed (e.g., which are not used for carrier aggregation or ENDC, see FIG. 4). With reference to FIG. 8, the first switch stack 300 includes eight gates 302 arranged in the stack 300. For example, the illustrated gates 302 may correspond to the gates 302 of a plurality of stacked transistors, with only the gates 302 illustrated for ease of description. The gates 302 have substantially the same length. In the illustrated example, the length of the gates is about 140 um; however, aspects of this disclosure are not limited thereto and the gate length may be designed such that the overall first switch stack 300 produced an insertion loss of less than a predetermined value. In some implementations, each of the switches 210n-1-210n in FIG. 4 may be implemented with a single instance of the first switch stack 300 of FIG. 8.

The second switch stack 310 of FIG. 9 may be used to connect filters 206a-206d which are multiplexed (e.g., which used for carrier aggregation or ENDC, see FIG. 4). With reference to FIG. 9, the second switch stack 310 includes seven gates 312 arranged in the stack 310; however, this is only one example and the second switch stack 310 can include fewer than seven gates 312, such as, six, five, or four gates 213 depending on the implementation. The gates 312 have substantially the same length. In the illustrated example, the length of the gates is about 180 um; however, aspects of this disclosure are not limited thereto and the gate length may be designed such that the overall second switch stack 310 produced an insertion loss of less than a predetermined value. For example, in some implementations, the gate length may be about 200 um or greater. In some implementations, each of the switches 210a-210d in FIG. 4 may be implemented with a single instance of the second switch stack 310 of FIG. 9.

The second switch stack 310 used for the switches 210a-210d that connect filters 206a-206d which are multiplexed may have a gate 312 length which is greater than the gate 302 length of the first switch stack 300 used for the switches 210n-1-210n that connect filters 206n-1 and 206n which are not multiplexed. By increasing the length of the gates 312 in the second stack 310, the Ron resistance of the second switch stack 310 can be reduced compared to the first switch stack 300, thereby reducing loading between the connected filters 206a-206d.

The second switch stack 310 used for the switches 210a-210d that connect filters 206a-206d which are multiplexed may have a fewer number of gates 312 than the number of gates 302 of the first switch stack 300 used for the switches 210n-1-210n that connect filters 206n-1 and 206n which are not multiplexed. By reducing the number of stacked gates 312 in the second switch stack 310, the Ron resistance of the second switch stack 310 can be reduced compared to the first switch stack 300, thereby reducing loading between connected filters 206a-206d. As described herein, reducing the Ron resistance of the second switch stack 310 can consume less battery power and reduce loading to the connected filters 206a-206d when used for multiplexing.

The filters 206a-206d used for multiplexing may be used for carrier aggregation or ENDC more often than for single band wireless communication. Carrier aggregation and ENDC typically use less power Pout than single band communication techniques. Because the number of gates 302, 312 in a stack 300, 310 relates to the amount of power that can be handled by the stack 300, 310, the second switch stack 310 does not require as many gates 312 in the stack 300. Thus, the second switch stack 310 can include a fewer number of gates 312 and still meet the power demands of multiplexing communication techniques (e.g., carrier aggregation and ENDC).

With reference back to FIG. 4, the ASM 202 can include switches 210a-210d configured to be used for multiplexing (e.g., carrier aggregation or ENDC) which include a stack 310 as described in connection with FIG. 9. The ASM 202 can also include switches 210n-1-210n not configured to be used for multiplexing which include a stack 300 as described in connection with FIG. 8. In such implementations, the switches 210a-210d configured to be used for multiplexing have a lower Ron resistance than the switches 210n-1-210n not configured to be used for multiplexing. By including switches 210a-210n of both types, the ASM 202 can provide sufficient power handling for the single band filters 206n-1 and 206n while also reducing loading between filters 206a-206d used for multiplexing.

Aspects of this disclosure provide a number of advantages over previous solutions using a single switch type in the ASM 202. For example, the multiplexing performance can be improved, in particular for carrier aggregation and ENDC which have lower current consumption, without affecting the performance of the remaining single frequency bands. In addition, the ASM 202 size can be implemented with the same size or a smaller die than an ASM 202 having only switch stacks 300 designed for single band use. In addition, by reducing the Ron resistance of the switches 210a-210d used for multiplexing, the filters 206a-206d do not need to be redesigned, for example, to have less loss to make up for the Ron resistance loading of multiple switches 210a-210d.

CONCLUSION

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency front end comprising:
    a plurality of filters configured to filter radio frequency signals, the filters including a first filter configured for single band wireless communication and two second filters configured for multiplexing wireless communication; and
    an antenna switch module including a first switch configured to connect an antenna to the first filter for the single band wireless communication, and two second switches configured to connect the antenna to the second filters for the multiplexing wireless communication, the second switches having a lower on-state resistance than the first switch.

2. The radio frequency front end of claim 1 wherein each of the second switches has a longer gate length than the first switch.

3. The radio frequency front end of claim 1 wherein each of the second switches have a fewer number of stacked gates than the first switch.

4. The radio frequency front end of claim 1 wherein the first switch is configured to handle a higher power level than each of the second switches.

5. The radio frequency front end of claim 1 wherein the antenna switch module has a die size that is the same or smaller than an antenna switch module having a same number of switches that all have the same configuration as the first switch.

6. The radio frequency front end of claim 1 wherein the multiplexing wireless communication includes carrier aggregation or evolved universal mobile telecommunications system, new radio, dual connectivity.

7. The radio frequency front end of claim 1 wherein the first switch has a plurality of gates each having a length of about 140 um and each of the second switches has a plurality of gates each having a length of about 180 um.

8. The radio frequency front end of claim 1 wherein the plurality of filters further include a third filter configured for single band wireless communication, the first and third filters each including duplexed receive and transmit filters, the two second filters including a transmit second filter and a receive second filter, and the plurality of filters further including two fourth filters including a transmit fourth filter and a duplexed fourth filter including duplexed receive and transmit filters.

9. A mobile device comprising:
    an antenna configured to transmit and received radio frequency signals;
    a plurality of filters configured to filter radio frequency signals, the filters including a first filter configured for single band wireless communication and two second filters configured for multiplexing wireless communication; and
    an antenna switch module including a first switch configured to connect the antenna to the first filter for the single band wireless communication, and two second switches configured to connect the antenna to the second filters for the multiplexing wireless communication, the second switches having a lower on-state resistance than the first switch.

10. The mobile device of claim 9 wherein each of the second switches has a longer gate length than the first switch.

11. The mobile device of claim 9 wherein each of the second switches have a fewer number of stacked gates than the first switch.

12. The mobile device of claim 9 wherein the first switch is configured to handle a higher power level than each of the second switches.

13. The mobile device of claim 9 wherein the antenna switch module has a die size that is the same or smaller than an antenna switch module having a same number of switches that all have the same configuration as the first switch.

14. The mobile device of claim 9 wherein the multiplexing wireless communication includes carrier aggregation or evolved universal mobile telecommunications system, new radio, dual connectivity.

15. The mobile device of claim 9 wherein the first switch has a plurality of gates each having a length of about 140 um and each of the second switches has a plurality of gates each having a length of about 180 um.

16. A radio frequency module comprising:

a front end including a plurality of filters configured to filter radio frequency signals, the filters including a first filter configured for single band wireless communication and two second filters configured for multiplexing wireless communication, and an antenna switch module including a first switch configured to connect an antenna terminal to the first filter for the single band wireless communication, and two second switches configured to connect the antenna terminal to the second filters for the multiplexing wireless communication, the second switches having a lower on-state resistance than the first switch; and an antenna coupled to the antenna terminal.

17. The radio frequency module of claim 16 wherein each of the second switches has a longer gate length than the first switch.

18. The radio frequency module of claim 16 wherein each of the second switches have a fewer number of stacked gates than the first switch.

19. The radio frequency module of claim 16 wherein the first switch is configured to handle a higher power level than each of the second switches.

20. The radio frequency module of claim 16 wherein the antenna switch module has a die size that is the same or smaller than an antenna switch module having a same number of switches that all have the same configuration as the first switch.

* * * * *